US011158143B2

(12) United States Patent
Liu et al.

(10) Patent No.: US 11,158,143 B2
(45) Date of Patent: Oct. 26, 2021

(54) VEHICLE DIAGNOSTIC METHOD AND DEVICE, AND COMPUTER READABLE STORAGE MEDIUM

(71) Applicant: SHENZHEN LAUNCH SOFTWARE CO., LTD., Guangdong (CN)

(72) Inventors: Jun Liu, Guangdong (CN); Chunwu Deng, Guangdong (CN); Zewei Wei, Guangdong (CN)

(73) Assignee: SHENZHEN LAUNCH SOFTWARE CO., LTD., Shenzhen (CN)

(*) Notice: Subject to any disclaimer, the term of this patent is extended or adjusted under 35 U.S.C. 154(b) by 398 days.

(21) Appl. No.: 16/265,111

(22) Filed: Feb. 1, 2019

(65) Prior Publication Data
US 2019/0333296 A1 Oct. 31, 2019

Related U.S. Application Data

(63) Continuation-in-part of application No. PCT/CN2018/084447, filed on Apr. 25, 2018.

(51) Int. Cl.
G07C 5/08 (2006.01)
G07C 5/00 (2006.01)

(52) U.S. Cl.
CPC .......... *G07C 5/0808* (2013.01); *G07C 5/008* (2013.01); *G07C 5/085* (2013.01); *G07C 5/0816* (2013.01)

(58) Field of Classification Search
CPC .... G07C 5/0808; G07C 5/008; G07C 5/0816; G07C 5/085
See application file for complete search history.

(56) References Cited

U.S. PATENT DOCUMENTS

2002/0193923 A1* 12/2002 Toyama ................ G07C 5/008
701/29.3
2004/0217852 A1* 11/2004 Kolls ..................... B60R 25/04
340/439

(Continued)

FOREIGN PATENT DOCUMENTS

CN          1904776          1/2007
CN          1904776 A    *   1/2007
(Continued)

OTHER PUBLICATIONS

Supplementary EP Search Report filed in EP 18 83 9662 dated May 29, 2020.

(Continued)

*Primary Examiner* — Hussein Elchanti
(74) *Attorney, Agent, or Firm* — Rankin, Hill & Clark LLP

(57) ABSTRACT

The present disclosure is applicable to the technical field of vehicle diagnosis, and provides a vehicle diagnostic method, a vehicle diagnostic system, and a vehicle diagnostic device. The vehicle diagnostic method comprises: determining a standard range of vehicle fault diagnosis; reading a current data stream of a vehicle in real time when a vehicle diagnosis instruction is received, and determining whether values of the current data stream are within a standard range; and outputting prompt information indicative of normal vehicle operation if the values of the current data stream are within the standard range; or outputting corresponding vehicle fault alarm information if the values of the current data stream are beyond the standard range. This present disclosure can improve an accuracy of vehicle fault diagnosis.

9 Claims, 6 Drawing Sheets

(56) References Cited

U.S. PATENT DOCUMENTS

| | | | |
|---|---|---|---|
| 2008/0039069 A1 | 2/2008 | Chigusa | |
| 2011/0196572 A1 | 8/2011 | Tsuchikiri | |
| 2013/0332488 A1* | 12/2013 | Christy | G06Q 30/0603 707/781 |
| 2014/0005881 A1* | 1/2014 | Hardesty | G07C 5/0808 701/32.8 |
| 2014/0277844 A1* | 9/2014 | Luke | G07C 5/008 701/2 |
| 2014/0331752 A1* | 11/2014 | Hall | G01M 15/102 73/114.75 |
| 2018/0105175 A1* | 4/2018 | Muller | G05D 1/021 |
| 2019/0108693 A1* | 4/2019 | Dudar | F02M 25/0809 |

FOREIGN PATENT DOCUMENTS

| | | |
|---|---|---|
| CN | 102521613 | 6/2012 |
| CN | 103336522 | 10/2013 |
| CN | 105335599 | 2/2016 |
| CN | 106970610 | 7/2017 |
| CN | 107918382 | 4/2018 |
| JP | 2010198158 | 9/2010 |

OTHER PUBLICATIONS

International Search Report filed in PCT/CN2018/084447 dated Jan. 30, 2019.
Chinese Office action filed in 201880000333.0 dated Jul. 7, 2020.

* cited by examiner

VEHICLE DIAGNOSTIC METHOD AND DEVICE, AND COMPUTER READABLE STORAGE MEDIUM

TECHNICAL FIELD

The present disclosure pertains to the technical field of vehicle diagnosis, and particularly to a vehicle diagnostic method, a vehicle diagnostic system, a vehicle diagnostic device, and a computer readable storage medium.

BACKGROUND

Automotive data stream are data parameters exchanged between an electronic control unit and sensors and an actuator and read by dedicated diagnostic equipment through a diagnosis interface. The data stream recorded in the automotive electronic control unit really reflects working voltages and statuses of the sensors and the actuator, provides a basis for automotive fault diagnosis.

Currently, when an automotive diagnosis device in a vehicle performs fault diagnosis on the vehicle, the automotive diagnosis device usually determines whether a fault occurs in the vehicle by comparing an automotive data stream collected in real time with a standard value range designated by diagnosis software. The used standard value range is an empirical value set by the diagnosis software, which results in an inaccurate detected vehicle fault diagnosis result.

SUMMARY

In view of this, the present disclosure provides a vehicle diagnostic method, a vehicle diagnostic system, and device, and a computer readable storage medium, which aims at resolving a problem that a detected vehicle fault diagnosis result is imprecise due to the fact that a standard value range used by an existing vehicle diagnostic device is an empirical value set by diagnosis software.

In a first aspect, the present disclosure provides a vehicle diagnostic method comprising: determining a standard range of vehicle fault diagnosis; reading a current data stream of a vehicle in real time when a vehicle diagnosis instruction is received, and determining whether values of the current data stream are within a standard range; and outputting prompt information indicative of normal vehicle operation if the values of the current data stream are within the standard range; or alternatively outputting corresponding vehicle fault alarm information if the values of the current data stream are beyond the standard range.

Based on the aforesaid technical solution, the step of determining a standard range of vehicle fault diagnosis particularly includes: collecting a sample data stream of the vehicle, counting the maximum value and the minimum value of the sample data stream, and storing the maximum value and the minimum value of the sample data stream as the standard range of the vehicle fault diagnosis.

Based on the aforesaid technical solution, the step of collecting a sample data stream of the vehicle, counting the maximum value and the minimum value of the sample data stream, and storing the maximum value and the minimum value of the sample data stream as the standard range of the vehicle fault diagnosis comprises: collecting, according to a preset period, a standard data stream under a normal vehicle operation; determining whether the standard data stream collected within the current period includes a data identifier and a data unit; deleting the standard data stream if the standard data stream does not include the data identifier or the data unit; or determining whether there is sample data stream matching the data identifier in the collected sample data stream if the standard data stream includes the data identifier and the data unit; and using the maximum value and the minimum value of the standard data stream to revise the maximum value and the minimum value of the matched sample data stream respectively if there is sample data stream matching the data identifier; or collecting and using the standard data stream as a sample data stream if there is no sample data stream matching the data identifier.

Based on the aforesaid technical solution, after the step of collecting a sample data stream of the vehicle, counting the maximum value and the minimum value of the sample data stream, and storing the maximum value and the minimum value of the sample data stream as the standard range of the vehicle fault diagnosis, the method further comprises: displaying the collected sample data stream and the standard range to a user, so that the user revises the standard range according to the displayed sample data stream; and revising the standard range according to the revising instruction if a revising instruction input by the user is received, wherein the revising instruction includes a revise object and a revise value.

Based on the aforesaid technical solution, the step of reading a current data stream of a vehicle in real time when a vehicle diagnosis instruction is received, and determining whether values of the current data stream are within the standard range comprises: reading the current data stream of the vehicle in real time when the vehicle diagnosis instruction is received, and determining whether the current data stream includes a data identifier and a data unit; deleting the current data stream if the current data stream does not include the data identifier or the data unit; or searching the collected sample data stream for a sample data stream matching the data identifier of the current data stream if the current data stream includes the data identifier and the data unit; and determining whether the maximum value and the minimum value of the current data stream are within a range between the maximum value and the minimum value of the matched sample data stream.

Based on the aforesaid technical solution, after the step of collecting a sample data stream of the vehicle, counting the maximum value and the minimum value of the sample data stream, and storing the maximum value and the minimum value of the sample data stream as the standard range of the vehicle fault diagnosis, the method further comprises: obtaining a vehicle identification number of the vehicle, establishing an correlation between the vehicle identification number, the sample data stream, and the standard range of the vehicle fault diagnosis, and uploading the correlation to a website server.

In a second aspect, the present disclosure provides a vehicle diagnostic device, comprising a memory, a processor, and a computer program stored in the memory and executable by the processor, wherein the processor is configured to execute the computer program to implement the steps of determining a standard range of vehicle fault diagnosis; reading a current data stream of a vehicle in real time when a vehicle diagnosis instruction is received, and determining whether values of the current data stream are within the standard range; and outputting prompt information indicative of normal vehicle operation if the values of the current data stream are within the standard range, or outputting corresponding vehicle fault alarm information if the values of the current data stream are beyond the standard range.

Based on the aforesaid technical solution, the processor is further configured to execute the computer program to implement the step of determining a standard range of vehicle fault diagnosis by collecting a sample data stream of the vehicle, counting the maximum value and the minimum value of the sample data stream, and storing the maximum value and the minimum value of the sample data stream as the standard range of the vehicle fault diagnosis.

Based on the aforesaid technical solution, the processor is further configured to execute the computer program to implement the step of collecting a sample data stream of the vehicle, counting the maximum value and the minimum value of the sample data stream, and storing the maximum value and the minimum value of the sample data stream as the standard range of the vehicle fault diagnosis by:

collecting a standard data stream under a normal vehicle operation according to a preset period;

determining whether the standard data stream collected within the current period comprises a data identifier and a data unit;

deleting the standard data stream if the standard data stream does not comprise the data identifier or the data unit;

or determining whether there is sample data stream matching the data identifier in the collected sample data stream, if the standard data stream comprises the data identifier and the data unit;

and using the maximum value and the minimum value of the standard data stream to revise the maximum value and the minimum value of the matched sample data stream respectively if there is collected sample data stream matching the data identifier;

collecting and using the standard data stream as a sample data stream if there is no collected sample data stream matching the data identifier.

Based on the aforesaid technical solution, the processor is further configured to execute the computer program to implement the step of displaying the collected sample data stream and the standard range to a user, so that the user revises the standard range according to the displayed sample data stream; and revising the standard range according to the revising instruction if a revising instruction as input by the user is received, wherein the revising instruction comprises a revise object and a revise value.

Based on the aforesaid technical solution, the processor is further configured to execute the computer program to implement the step of reading a current data stream of a vehicle in real time when a vehicle diagnosis instruction is received, and determining whether values of the current data stream are within the standard range by:

reading the current data stream of the vehicle in real time when the vehicle diagnosis instruction is received, and determining whether the current data stream comprises a data identifier and a data unit;

deleting the current data stream if the current data stream does not comprise the data identifier or the data unit;

or searching the collected sample data stream for a sample data stream matching the data identifier of the current data stream if the current data stream comprises the data identifier and the data unit;

and determining whether the maximum value and the minimum value of the current data stream are within a range between the maximum value and the minimum value of the matched sample data stream.

A third aspect of the present disclosure provides a computer readable storage medium which stores a computer program, wherein a processor is configured to execute the computer program to implement the steps of determining a standard range of vehicle fault diagnosis; reading a current data stream of a vehicle in real time when a vehicle diagnosis instruction is received, and determining whether values of the current data stream are within the standard range; and outputting prompt information indicative of normal vehicle operation if the values of the current data stream are within the standard range, or outputting corresponding vehicle fault alarm information if the values of the current data stream are beyond the standard range.

Based on the aforesaid technical solution, the processor is further configured to execute the computer program to implement the step of determining a standard range of vehicle fault diagnosis by collecting a sample data stream of the vehicle, counting the maximum value and the minimum value of the sample data stream, and storing the maximum value and the minimum value of the sample data stream as the standard range of the vehicle fault diagnosis.

Based on the aforesaid technical solution, the processor is further configured to execute the computer program to implement the step of collecting a sample data stream of the vehicle, counting the maximum value and the minimum value of the sample data stream, and storing the maximum value and the minimum value of the sample data stream as the standard range of the vehicle fault diagnosis by:

collecting a standard data stream under a normal vehicle operation according to a preset period;

determining whether the standard data stream collected within the current period comprises a data identifier and a data unit;

deleting the standard data stream if the standard data stream does not comprise the data identifier or the data unit;

or determining whether there is sample data stream matching the data identifier in the collected sample data stream, if the standard data stream comprises the data identifier and the data unit;

and using the maximum value and the minimum value of the standard data stream to revise the maximum value and the minimum value of the matched sample data stream respectively if there is collected sample data stream matching the data identifier;

collecting and using the standard data stream as a sample data stream if there is no collected sample data stream matching the data identifier.

Based on the aforesaid technical solution, the processor is further configured to execute the computer program to implement the step of displaying the collected sample data stream and the standard range to a user, so that the user revises the standard range according to the displayed sample data stream; and revising the standard range according to the revising instruction if a revising instruction as input by the user is received, wherein the revising instruction comprises a revise object and a revise value.

Based on the aforesaid technical solution, the processor is further configured to execute the computer program to implement the step of reading a current data stream of a vehicle in real time when a vehicle diagnosis instruction is received, and determining whether values of the current data stream are within the standard range by:

reading the current data stream of the vehicle in real time when the vehicle diagnosis instruction is received, and determining whether the current data stream comprises a data identifier and a data unit;

deleting the current data stream if the current data stream does not comprise the data identifier or the data unit;

or searching the collected sample data stream for a sample data stream matching the data identifier of the current data stream if the current data stream comprises the data identifier and the data unit;

and determining whether the maximum value and the minimum value of the current data stream are within a range between the maximum value and the minimum value of the matched sample data stream.

In the present disclosure, the sample data stream of the vehicle is collected, the maximum value and the minimum value of the collected sample data stream are used as the standard range of the vehicle fault diagnosis, subsequently, the current data stream of the vehicle collected in real time is compared with the standard range to determine whether a fault occurs in the vehicle, and a corresponding fault detection result is output, such that the precision of the vehicle fault diagnosis may be improved.

BRIEF DESCRIPTION OF DRAWINGS

In order to describe the technical solutions in the embodiments of the present disclosure more clearly, the following briefly describes the accompanying drawings.

DESCRIPTION OF EMBODIMENTS

In the following description, for description rather than limitation, specific details such as a particular system structure and a technology are provided for thorough understanding of the embodiments of the present disclosure. To describe the technical solutions of the present disclosure, the following gives a description by using specific embodiments.

Figure 1:
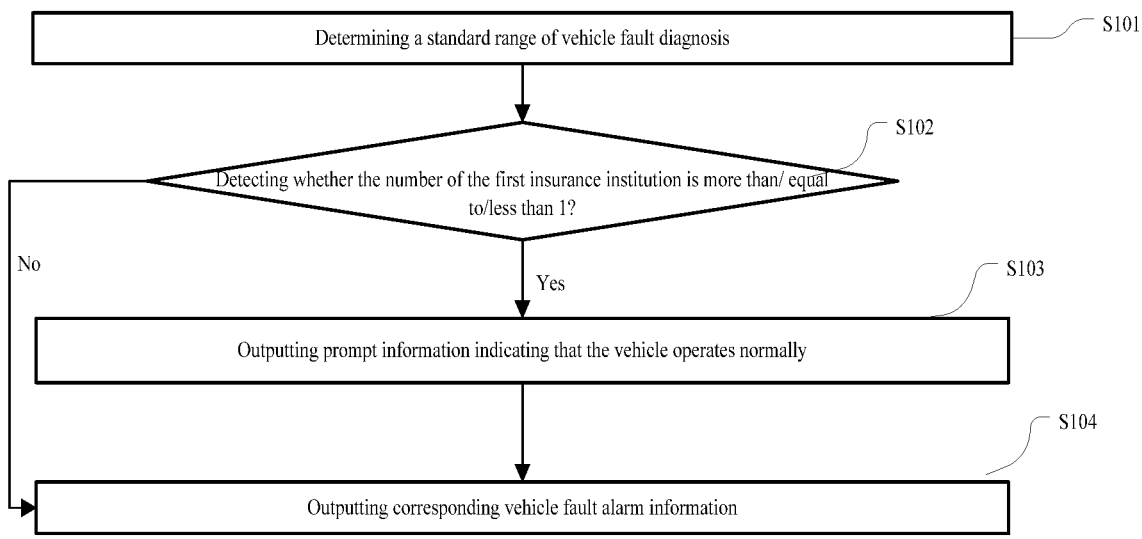
FIG. 1 illustrates a schematic flow diagram of implementing a vehicle diagnostic method according to an embodiment of the present disclosure.

FIG. 1 is a schematic flow diagram of implementing a vehicle diagnostic method according to an embodiment of the present disclosure. The method is applied to a vehicle diagnostic device. As shown in FIG. 1, an implementation procedure of the method is described in detail as follows:

Step 101, determining a standard range of vehicle fault diagnosis.

Wherein, the step of determining a standard range of vehicle fault diagnosis particularly includes: collecting a sample data stream of the vehicle, counting the maximum value and the minimum value of the sample data stream, and storing the maximum value and the minimum value of the sample data stream as the standard range of the vehicle fault diagnosis.

Since data stream comparison is meaningful for comparison between data of a same vehicle model, a same vehicle series, and a same vehicle system. Therefore, to accurately select a correct sample data stream subsequently, in this embodiment, a vehicle identification number (Vehicle Identification Number, VIN) is added to the collected sample data stream of the vehicle. The VIN includes 17 characters, and therefore, is commonly referred to as a 17-bit code. The VIN includes information such as a manufacturer, an age, a vehicle model, a vehicle body model and code, an engine code, and an assembly location of the vehicle. In addition, to distinguish between different types of data streams of a same vehicle, various collected sample data streams further carry data identifiers used to mark data types.

Figure 2:
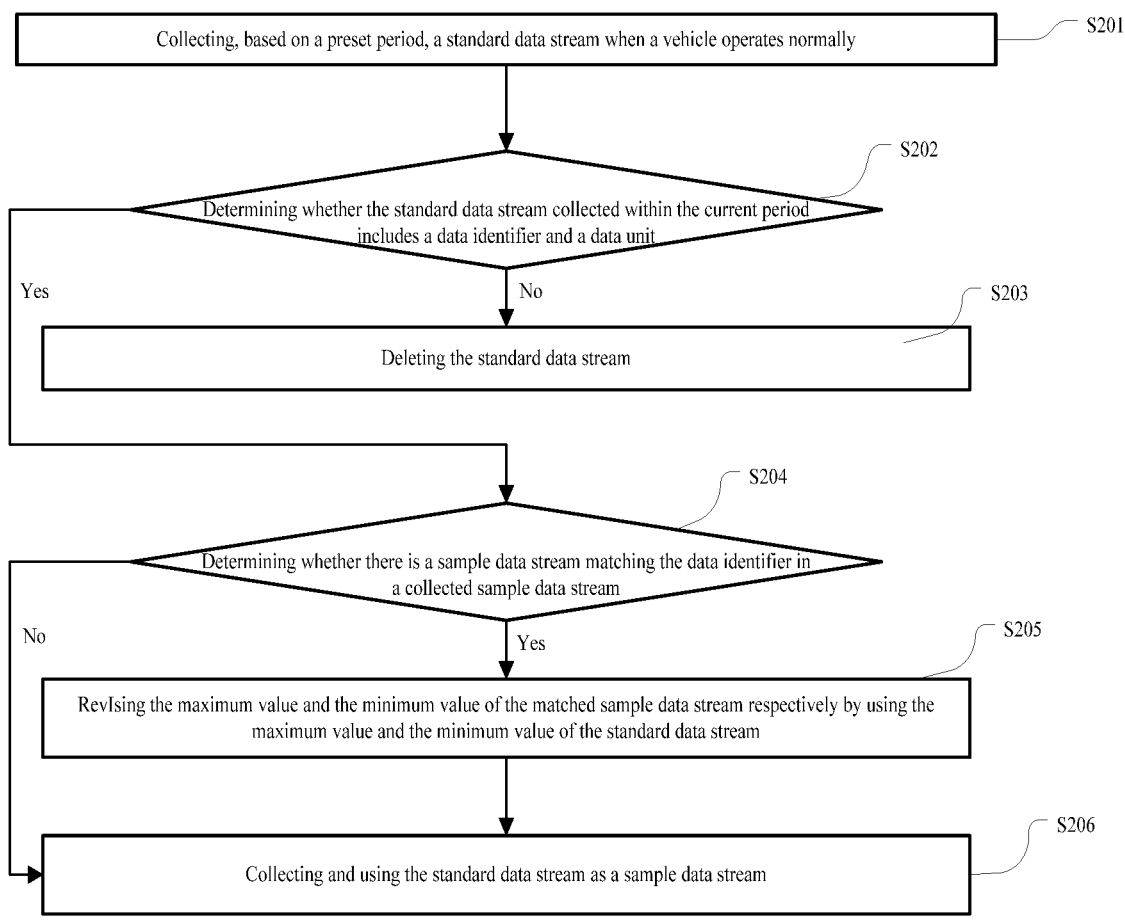
FIG. 2 illustrates a schematic flow diagram of a specific implementation of step S101 in the vehicle diagnostic method according to an embodiment of the present disclosure.

Preferably, FIG. 2 illustrates a specific implementation procedure of step S101. As shown in FIG. 2, step S101 particularly includes the following steps:

Step 201, collecting, according to a preset period, a standard data stream when a vehicle operates normally.

Step 202, determining whether the standard data stream collected within the current period includes a data identifier and a data unit; and performing step 203 if the standard data stream does not include the data identifier or the data unit; or performing step 204 if the standard data stream includes the data identifier and the data unit.

Step 203, deleting the standard data stream.

Step 204, determining whether there is sample data stream matching the data identifier in the collected sample data stream; and if there is sample data stream matching the data identifier, performing step 205; or performing step 206 if the sample data stream matching the data identifier does not exist.

Step 205, using the maximum value and the minimum value of the standard data stream to revise the maximum value and the minimum value of the matched sample data stream respectively.

Step 206, collecting and using the standard data stream as a sample data stream.

During collection of the sample data stream of the vehicle, it needs to be ensured that the vehicle is in a normal operation state, and a collected data stream of the vehicle needs to carry a data identifier and a data unit. When an operation state of the vehicle is abnormal within a particular data stream collection period or a data stream collected within the particular data stream collection period does not include a data identifier or a data unit, the data stream collected within the current period is directly deleted, and is not collected, so that the reliability of the collected sample data stream may be ensured.

When the sample data stream matching the data identifier carried in the currently collected standard data stream does not exist in the collected sample data stream, it indicates that it is the first time to collect a sample data stream of the standard data stream of this type. In this case, the currently collected standard data stream is collected and used as an initialized sample data stream corresponding to this type.

When the sample data stream matching the data identifier carried in the currently collected standard data stream exists in the collected sample data stream, it indicates that it is not the first time to collect a sample data stream of the standard data stream of this type. In this case, the currently collected standard data stream is used to revise the collected corresponding sample data stream.

Said using the maximum value and the minimum value of the standard data stream to revise the maximum value and the minimum value of the matched sample data stream respectively particularly includes:

respectively comparing the maximum value and the minimum value of the currently collected standard data stream with the maximum value and the minimum value of the sample data stream; modifying the maximum value of the sample data stream into the maximum value of the standard data stream if the maximum value of the standard data stream is greater than the maximum value of the sample data stream; and modifying the minimum value of the sample data stream into the minimum value of the standard data stream if the minimum value of the standard data stream is less than the minimum value of the sample data stream.

In this embodiment, a sample data stream of the vehicle may be collected once every a time period, and the standard range used for vehicle fault determining of the vehicle may be revised each time after the sample data stream of the vehicle is collected, thereby ensuring the reliability of a subsequent vehicle fault determining and detection result.

Step 102, reading a current data stream of the vehicle in real time when a vehicle diagnosis instruction is received, and determining whether values of the current data stream are within the standard range; and performing step 103 if the values of the current data stream are within the standard range; or performing step 104 if the values of the current data stream are beyond the standard range.

Figure 3:
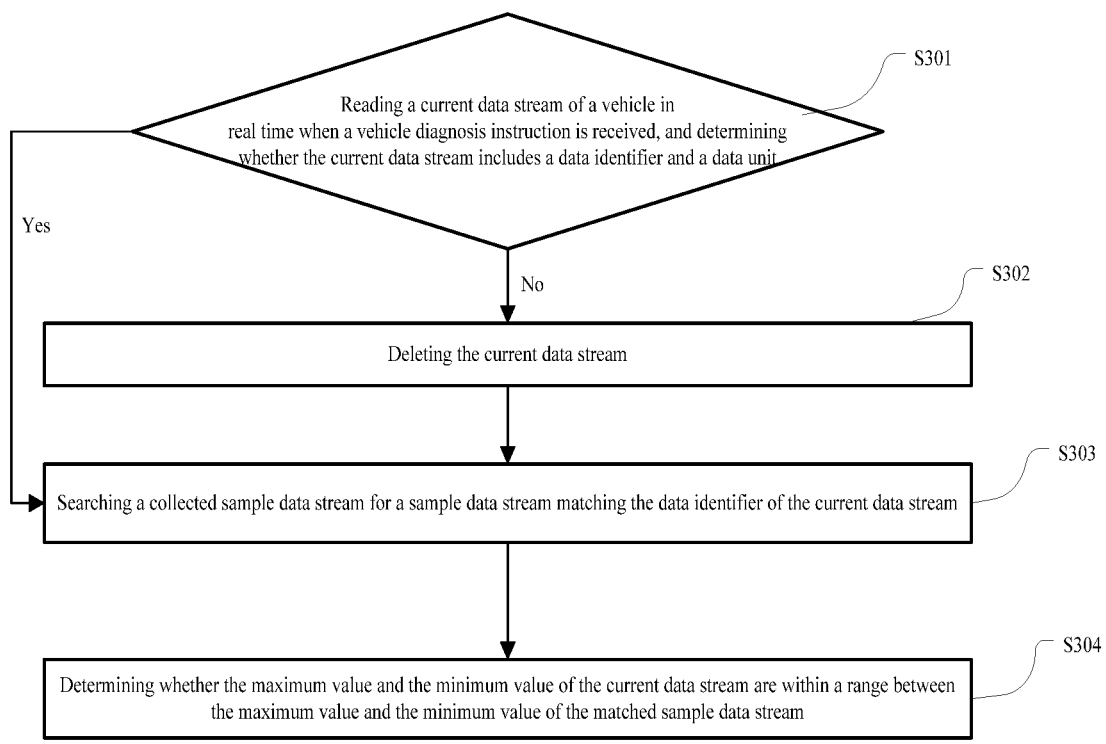
FIG. 3 illustrates a schematic flow diagram of a specific implementation of step S102 in the vehicle diagnostic method according to an embodiment of the present disclosure.

Preferably, FIG. 3 illustrates a specific implementation procedure of step 102. As shown in FIG. 2, step 102 particularly includes:

Step 301, reading the current data stream of the vehicle in real time when the vehicle diagnosis instruction is received, and determining whether the current data stream includes a data identifier and a data unit; and performing step 302 if the current data stream does not include the data identifier or the data unit; or performing step 303 if the current data stream includes the data identifier and the data unit.

Step 302, deleting the current data stream.

Step 303, searching the collected sample data stream for a sample data stream matching the data identifier of the current data stream.

Step 304, determining whether the maximum value and the minimum value of the current data stream are within a range between the maximum value and the minimum value of the matched sample data stream.

In this embodiment, considering that a data stream that does not include a data identifier or a data unit cannot be used for precise comparison, a currently collected data stream that does not include a data identifier or a data unit is filtered out and is not used for comparison.

In this embodiment, if the current data stream read in real time includes the data identifier and the data unit, during real-time refreshing and comparison, metric-inch conversion is performed for each data stream, to obtain the maximum value and the minimum value of the current data stream in a metric/inch mode, and in addition, metric-inch conversion is performed for the matched sample data stream, to obtain the maximum value and the minimum value of the sample data stream in the current metric/inch mode. Then, the maximum value and the minimum value of the current data stream in the current metric/inch mode are respectively compared with the maximum value and the minimum value of the matched sample data stream in the current metric/inch mode, to determine whether the maximum value and the minimum value of the current data stream are within the standard range. In this way, collected sample data stream may be compared with a real-time data stream in different languages and different metric/inch modes.

Step 103, outputting prompt information indicative of normal vehicle operation.

In this embodiment, when the maximum value and the minimum value of the current data stream are within the standard range, it indicates that the vehicle operates normally, and in this case, the prompt information indicative of normal vehicle operation is displayed on a vehicle diagnosis display interface.

Step 104, outputting corresponding vehicle fault alarm information.

In this embodiment, when the maximum value and the minimum value of the current data stream exceed the standard range, it indicates that a fault occurs in the vehicle, and in this case, a fault type of the vehicle is determined according to the data identifier of the current data stream with reference to specific values by which the maximum value and the minimum value exceed the standard range, and preset fault alarm information corresponding to the fault type is output. For example, marks of different warning colors may be displayed and/or corresponding fault type voice prompts are given, to send vehicle fault alarm prompts to the user.

As may be learned from the above, in the vehicle diagnostic method provided in this embodiment, the sample data stream of the vehicle is collected, the maximum value and the minimum value of the collected sample data stream are used as the standard range of the vehicle fault diagnosis, subsequently, the current data stream of the vehicle collected in real time is compared with the standard range to determine whether a fault occurs in the vehicle, and a corresponding fault detection result is output, thereby improving the precision of the vehicle fault diagnosis.

Figure 4:
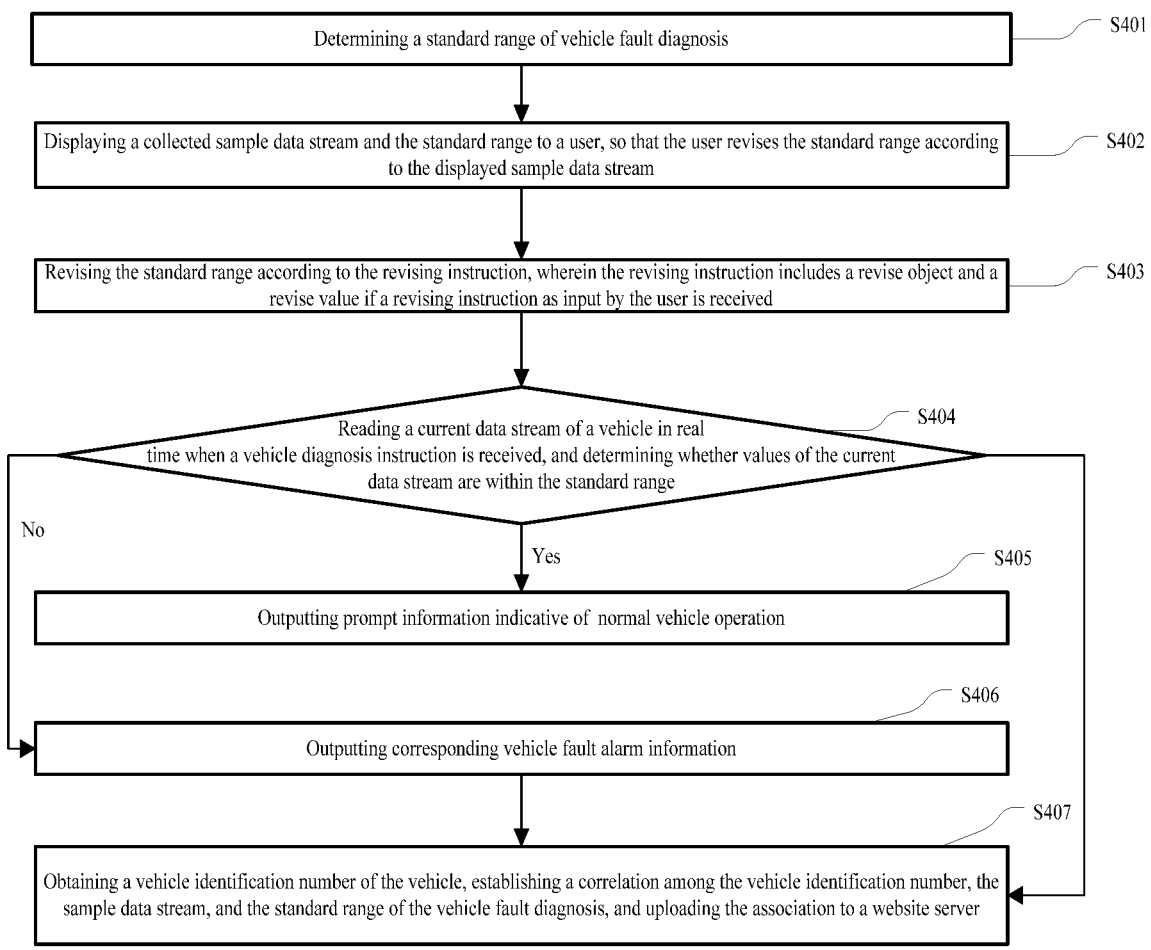
FIG. 4 illustrates a schematic flow diagram of implementing a vehicle diagnostic method according to another embodiment of the present disclosure.

FIG. 4 is a schematic flow diagram of implementing a vehicle diagnostic method according to another embodiment of the present disclosure. The method is applied to a vehicle diagnostic device. As shown in FIG. 4, because the implementations of step 401, step S404 and step S405 in this embodiment are respectively and completely the same as the implementations of step S101 to step S103 in the embodiment shown in FIG. 1, details are not described herein again. Compared with the foregoing embodiment, the vehicle diagnostic method provided in this embodiment further includes the following steps:

Step S402, displaying collected sample data stream and the standard range to a user, so that the user revises the standard range according to the displayed sample data stream.

Step S403, if a revising instruction input by the user is received, revising the standard range according to the revising instruction, wherein the revising instruction includes a revise object and a revise value.

In this embodiment, the revise object in the revising instruction includes a data identifier of a sample data stream to be revised, a maximum value of the sample data stream to be revised, and/or a minimum value of the sample data stream to be revised. The revise value includes a maximum value of a revised sample data stream and/or a minimum value of the revised sample data stream.

In this embodiment, a vehicle diagnostic device presents, to the user on a display interface, the collected sample data stream and the standard range that is obtained by executing a computer program processing procedure, and the user is allowed to revise the standard range, in other words, the maximum value and the minimum value of the sample data stream, and use the maximum value and the minimum value of the revise sample data stream as a standard range used for vehicle fault diagnosis and determining. In this way, the precision of the vehicle fault diagnosis may be further improved.

Preferably, compared with the previous embodiment, the vehicle diagnostic method provided in this embodiment further includes:

step 404, reading a current data stream of a vehicle in real time when a vehicle diagnosis instruction is received, and determining whether values of the current data stream are within the standard range; if the values of the current data stream are within the standard range, executing step 405, if the values of the current data stream are beyond the standard range, executing step 406;

step 405, outputting prompt information indicative of normal vehicle operation;

step 406, outputting corresponding vehicle fault alarm information;

step 407, obtaining a vehicle identification number of the vehicle, establishing an correlation between the vehicle identification number, the sample data stream, and the standard range of the vehicle fault diagnosis, and uploading the correlation to a website server.

In this embodiment, the vehicle identification number includes information such as a manufacturer, an age, a vehicle model, a vehicle body model and code, an engine code, and an assembly location of the vehicle. After the correlation is established between the vehicle identification number, the sample data stream, and the standard range of the vehicle fault diagnosis, the correlation is sent to the website server in a form of one piece of data information, and is stored. In this way, another vehicle diagnostic device can obtain the sample data stream of the vehicle and the standard range of the vehicle fault diagnosis from the website server, so that vehicle diagnosis is more intelligent, and the user experience is further improved.

As may be learned from the above, compared with the previous embodiment, in the vehicle diagnostic method provided in this embodiment, since the user is allowed to revise the standard range of vehicle diagnosis, the reliability of the standard range is improved, and the precision of the vehicle diagnosis is further improved. Since the vehicle identification number of the vehicle, the sample data stream, and the standard range of the vehicle fault diagnosis are uploaded to the website server, so that another vehicle diagnostic device can directly obtain the sample data stream of the vehicle and the standard range of the vehicle fault diagnosis from the website server, and use the obtained sample data stream of the vehicle and the obtained standard range of the vehicle fault diagnosis to perform vehicle diagnosis on another vehicle of a same vehicle type, thereby further improving an intelligence of the vehicle diagnosis, and improving a user experience.

As an example of specific implementation, a specific implementation of the vehicle diagnostic method provided in the embodiments of the present disclosure is described by taking a temperature data stream of an engine of a vehicle as an example, which is described in detail as follows:

determining a standard range of a temperature data stream of the engine when the vehicle operates normally;

reading a current temperature data stream of the engine of the vehicle in real time when a vehicle diagnosis instruction is received, and determining whether values of the current temperature data stream are within the standard range; and outputting prompt information indicative of normal vehicle operation if the values of the current temperature data stream are within the standard range; or outputting corresponding vehicle fault alarm information if the values of the current temperature data stream are beyond the standard range.

It should be noted that because specific implementations of the steps in this implementation example are completely the same as the implementations of step 101 to step 104 in the embodiment shown in FIG. 1, details are not repeatedly described herein.

In this implementation example, the standard range of the temperature data stream of the engine when the vehicle operates normally is determined, subsequently, the current temperature data stream of the vehicle collected in real time is compared with the standard range to determine whether a fault occurs in the vehicle, and a corresponding fault detection result is output, such that the precision of vehicle fault diagnosis may be improved.

Figure 5:
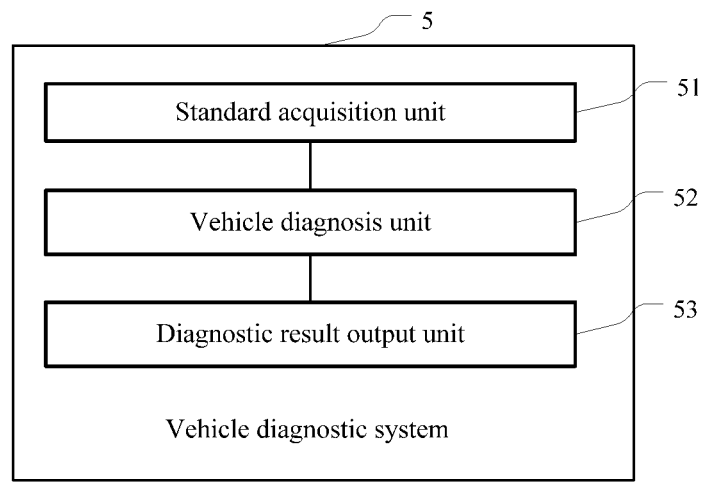
FIG. 5 illustrates a schematic structural diagram of a vehicle diagnostic system according to an embodiment of the present disclosure.

FIG. 5 is a schematic structural diagram of a vehicle diagnostic system according to an embodiment of the present disclosure. The system is applied to a vehicle diagnostic device. For describing conveniently, only the part related to this embodiment is shown.

As shown in FIG. 5, a vehicle diagnostic system 5 provided in this embodiment includes:

a standard acquisition unit 51 configured to determine a standard range of vehicle fault diagnosis;

a vehicle diagnosis unit 52 configured to read a current data stream of a vehicle in real time when a vehicle diagnosis instruction is received, and determine whether values of the current data stream are within the standard range; and a diagnostic result output unit 53 configured to:

output prompt information indicative of normal vehicle operation if the values of the current data stream are within the standard range; or output corresponding vehicle fault alarm information if the values of the current data stream are beyond the standard range.

Optionally, the standard acquisition unit 51 is particularly configured to:

collect a sample data stream of the vehicle, count the maximum value and the minimum value of the sample data stream, and store the maximum value and the minimum value of the sample data stream as the standard range of the vehicle fault diagnosis.

Optionally, the standard acquisition unit 51 is particularly configured to:

collect a standard data stream under a normal vehicle operation according to a preset period;

determine whether the standard data stream collected within the current period includes a data identifier and a data unit;

delete the standard data stream if the standard data stream does not include the data identifier or the data unit; or determine whether there is sample data stream matching the data identifier in the collected sample data stream if the standard data stream includes the data identifier and the data unit; and use the maximum value and the minimum value of the standard data stream to revise the maximum value and the minimum value of the matched sample data stream respectively if there is sample data stream matching the data identifier; or collect and use the standard data stream as a sample data stream if there is no sample data stream matching the data identifier.

Optionally, the vehicle diagnosis unit 52 is particularly configured to:

read the current data stream of the vehicle in real time when the vehicle diagnosis instruction is received, and determine whether the current data stream includes a data identifier and a data unit;

delete the current data stream if the current data stream does not include the data identifier or the data unit; or search the collected sample data stream for a sample data stream matching the data identifier of the current data stream if the current data stream includes the data identifier and the data unit; and determine whether the maximum value and the minimum value of the current data stream are within a range between the maximum value and the minimum value of the matched sample data stream.

Figure 6:
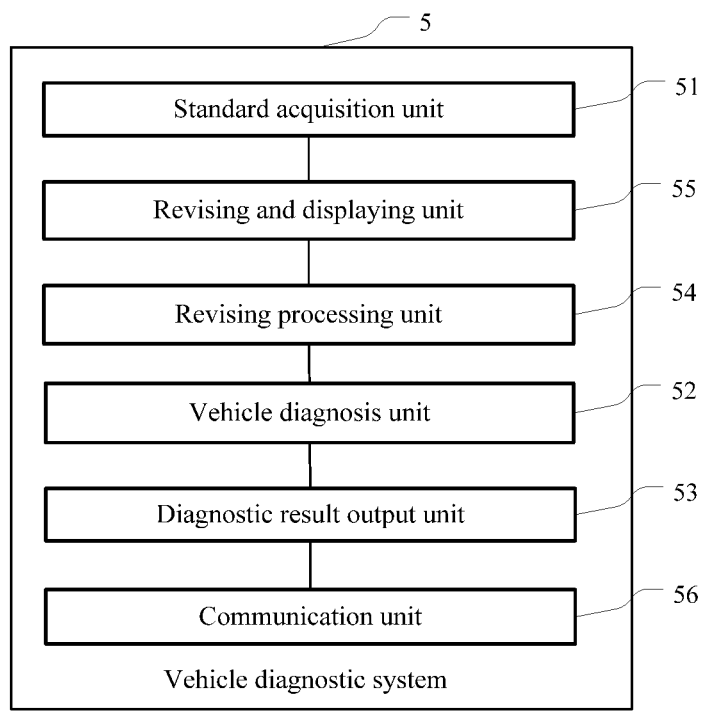
FIG. 6 illustrates a schematic structural diagram of a vehicle diagnostic system according to another embodiment of the present disclosure.

Optionally, as shown in FIG. 6, in another embodiment, the vehicle diagnostic system 5 further comprises:

a revising and displaying unit 54 configured to display the collected sample data stream and the standard range to a user, so that the user revises the standard range according to the displayed sample data stream; and a revising and processing unit 55 configured to: revise the standard range according to the revising instruction if a revising instruction input by the user is received, where the revising instruction includes a revise object and a revise value.

Optionally, the vehicle diagnostic system 5 comprises:

a communications unit 56 configured to obtain a vehicle identification number of the vehicle, establish a correlation among the vehicle identification number, the sample data stream, and the standard range of the vehicle fault diagnosis, and upload the correlation to a website server.

It should be noted that, since the units of the system provided in this embodiment of the present disclosure are based on a same concept as the method embodiment of the present disclosure, technical effects thereof are the same as those of the method embodiment of the present disclosure. Regarding concrete content, reference may be made to relevant descriptions in the method embodiment of the present disclosure, and it is not repeatedly described herein.

Therefore, it may be seen that, in the vehicle diagnostic system provided in this embodiment, the sample data stream of the vehicle is collected, the maximum value and the minimum value of the collected sample data stream are used as the standard range of the vehicle fault diagnosis, subsequently, the current data stream of the vehicle collected in real time is compared with the standard range to determine whether a fault occurs in the vehicle, and a corresponding fault detection result is output, such that the precision of the vehicle fault diagnosis may be improved.

It should be understood that sequence numbers of the steps in this embodiment do not represent an execution sequence. The execution sequence of the processes should be determined according to functions and internal logic. The sequence numbers should not constitute any limitation to an implementation process of this embodiment of the present disclosure.

Figure 7:
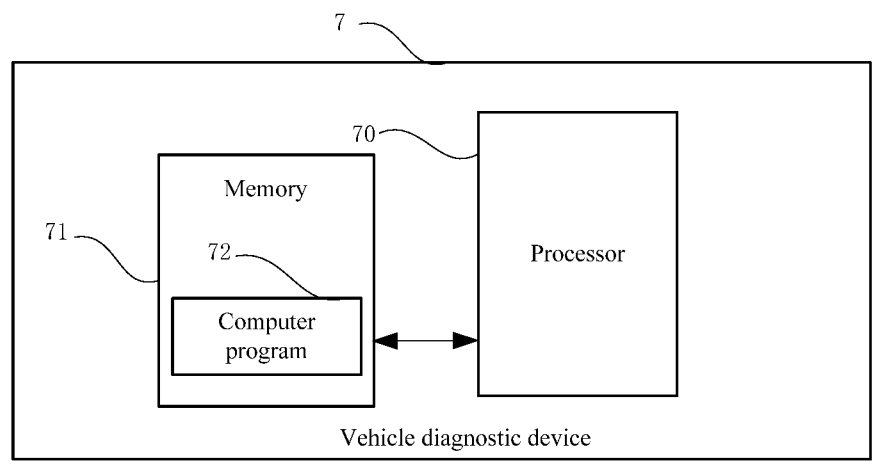
FIG. 7 illustrates a schematic structural diagram of a vehicle diagnostic device according to an embodiment of the present disclosure.

FIG. 7 is a schematic structural diagram of a vehicle diagnostic device according to an embodiment of the present disclosure. As shown in FIG. 7, the vehicle diagnostic device in this embodiment comprises a processor 70, a memory 71, and a computer program 72 stored in the memory 71 and executable by the processor 70. The processor 70 is configured to execute the computer program 72 to implement functions of the various units in the system embodiment, such as functions of the modules 51-53 shown in FIG. 5. The computer program 72 may be divided into one or more units, and the one or more units are stored in the memory 71 and are executed by the processor 70 so as to implement the present disclosure. The one or more units may be a series of computer program instruction segments that can complete a particular function, and the instruction segments are used to describe an execution process of the computer program 72 in the device. Alternatively, when the processor 70 executes the computer program 72, the processor 70 implements the steps in the method embodiment, such as the steps 101-103 shown in FIG. 1.

For example, when the processor 70 executes the computer program 72, the processor 70 implements the following steps of:

determining a standard range of vehicle fault diagnosis;

reading a current data stream of a vehicle in real time when a vehicle diagnosis instruction is received, and determining whether values of the current data stream are within the standard range; and outputting prompt information indicative of normal vehicle operation if the values of the current data stream are within the standard range; or outputting corresponding vehicle fault alarm information if the values of the current data stream are beyond the standard range.

In one embodiment, when the processor 70 executes the computer program 72, the processor 70 may further implement the following steps of:

collecting a sample data stream of the vehicle, counting the maximum value and the minimum value of the sample data stream, and storing the maximum value and the minimum value of the sample data stream as the standard range of the vehicle fault diagnosis.

In one embodiment, when the processor 70 is further configured to execute the computer program 72 to implement the following steps of:

collecting a standard data stream under a normal vehicle operation according to a preset period;

determining whether the standard data stream collected within the current period includes a data identifier and a data unit;

deleting the standard data stream if the standard data stream does not include the data identifier or the data unit; or determining whether a sample data stream matching the data identifier exists in the collected sample data stream if the standard data stream includes the data identifier and the data unit; and using the maximum value and the minimum value of the standard data stream to revise the maximum value and the minimum value of the matched sample data stream respectively if there is sample data stream matching the data identifier; or collecting and using the standard data stream as a sample data stream if there is no sample data stream matching the data identifier.

In one embodiment, when processor 70 is further configured to execute the computer program 72 to implement the following steps of:

displaying the collected sample data stream and the standard range to a user, so that the user revises the standard range according to the displayed sample data stream; and revising the standard range according to the revising instruction if a revising instruction input by the user is received, wherein the revising instruction includes a revise object and a revise value.

In one embodiment, the processor 70 is further configured to execute the computer program 72 to implement the following steps of:

reading the current data stream of the vehicle in real time when the vehicle diagnosis instruction is received, and determining whether the current data stream includes a data identifier and a data unit;

deleting the current data stream if the current data stream does not include the data identifier or the data unit; or searching the collected sample data stream for a sample data stream matching the data identifier of the current data stream if the current data stream includes the data identifier and the data unit; and determining whether the maximum value and the minimum value of the current data stream are within a range between the maximum value and the minimum value of the matched sample data stream.

In one embodiment, the processor 70 is further configured to execute the computer program 72 to implement the following steps of:

obtaining a vehicle identification number of the vehicle, establishing a correlation among the vehicle identification number, the sample data stream, and the standard range of the vehicle fault diagnosis, and uploading the correlation to a website server.

The vehicle diagnostic device 7 may include but is not limited to the processor 70 and the memory 71. The one of ordinary skill in the art may understand that FIG. 7 shows only an example of the vehicle diagnostic device 7 but does not limit the vehicle diagnostic device 7. The vehicle diagnostic device 7 may include more or fewer components than those shown in the figures, or some components may be combined, or the vehicle diagnostic device may include different components. For example, the vehicle diagnostic device may further include an input/output device, a network access device, a bus, and the like.

The processor 70 may be a central processing unit (Central Processing Unit, CPU), or the processor may be another general purpose processor, a digital signal processor (Digital Signal Processor, DSP), an application specific integrated circuit (Application Specific Integrated Circuit, ASIC), a field-programmable gate array (Field-Programmable Gate Array, FPGA) or another programmable logic device, a discrete gate or transistor logic device, a discrete hardware component, or the like. The general purpose processor may be a microprocessor or the processor may be any normal processor, or the like.

The memory 71 may be an internal storage unit of the vehicle diagnostic device 7, for example, a hard disk or a memory of the vehicle diagnostic device 7. The memory 71 may alternatively be an external storage device of the vehicle diagnostic device 7, for example, a plug-connected hard disk, a smart media card (Smart Media Card, SMC), a secure digital (Secure Digital, SD) card, or a flash card (Flash Card) disposed on the vehicle diagnostic device 7. Further, the memory 71 may alternatively include both the internal storage unit and the external storage device of the vehicle diagnostic device 7. The memory 71 is configured to store the computer program and another program and data needed by the vehicle diagnostic device 7. The memory 71 may be further configured to temporarily store data that is output or that is to be output.

The present disclosure further discloses a computer readable storage medium which stores a computer program 72, a processor 70 is configured to execute the computer program 70 to implement the steps of determining a standard range of vehicle fault diagnosis; reading a current data stream of a vehicle in real time when a vehicle diagnosis instruction is received, and determining whether values of the current data stream are within the standard range; and outputting prompt information indicative of normal vehicle operation if the values of the current data stream are within the standard range, or outputting corresponding vehicle fault alarm information if the values of the current data stream are beyond the standard range.

In one embodiment, the processor 70 is further configured to execute the computer program 72 to implement the step of determining a standard range of vehicle fault diagnosis by collecting a sample data stream of the vehicle, counting the maximum value and the minimum value of the sample data stream, and storing the maximum value and the minimum value of the sample data stream as the standard range of the vehicle fault diagnosis.

In one embodiment, the processor 70 is further configured to execute the computer program 72 to implement the step of collecting a sample data stream of the vehicle, counting the maximum value and the minimum value of the sample data stream, and storing the maximum value and the minimum value of the sample data stream as the standard range of the vehicle fault diagnosis by:

collecting a standard data stream under a normal vehicle operation according to a preset period;

determining whether the standard data stream collected within the current period comprises a data identifier and a data unit;

deleting the standard data stream if the standard data stream does not comprise the data identifier or the data unit;

or determining whether there is sample data stream matching the data identifier in the collected sample data stream, if the standard data stream comprises the data identifier and the data unit;

and using the maximum value and the minimum value of the standard data stream to revise the maximum value and the minimum value of the matched sample data stream respectively if there is collected sample data stream matching the data identifier;

collecting and using the standard data stream as a sample data stream if there is no collected sample data stream matching the data identifier.

In one embodiment, the processor 70 is further configured to execute the computer program 72 to implement the step of displaying the collected sample data stream and the standard range to a user, so that the user revises the standard range according to the displayed sample data stream; and revising the standard range according to the revising instruction if a revising instruction as input by the user is received, wherein the revising instruction comprises a revise object and a revise value.

In one embodiment, the processor 70 is further configured to execute the computer program 72 to implement the step of reading a current data stream of a vehicle in real time when a vehicle diagnosis instruction is received, and determining whether values of the current data stream are within the standard range by:

reading the current data stream of the vehicle in real time when the vehicle diagnosis instruction is received, and determining whether the current data stream comprises a data identifier and a data unit;

deleting the current data stream if the current data stream does not comprise the data identifier or the data unit;

or searching the collected sample data stream for a sample data stream matching the data identifier of the current data stream if the current data stream comprises the data identifier and the data unit;

and determining whether the maximum value and the minimum value of the current data stream are within a range between the maximum value and the minimum value of the matched sample data stream.

It may be clearly understood by one or ordinary skill in the art that, for describing conveniently and concisely, dividing of the aforesaid various functional units, functional modules is exemplified merely, in an actual application, the aforesaid functions may be assigned to different functional units and functional modules to be accomplished, that is, an inner structure of a data synchronizing device is divided into functional units or modules so as to accomplish the whole or a part of functionalities described above. The various functional units, modules in the embodiments may be integrated into a processing unit, or each of the units exists independently and physically, or two or more than two of the units are integrated into a single unit. The aforesaid integrated unit can by either realized in the form of hardware or in the form of software functional units. In addition, specific names of the various functional units and modules are only used for distinguishing from each other conveniently, but not intended to limit the protection scope of the present disclosure. Regarding a specific working process of the units and modules in the aforesaid device, please refer to a corresponding process in the aforesaid method embodiments, it is not repeatedly described herein.

In the foregoing embodiments, descriptions of the embodiments have emphases, regarding a part that is not described or recorded in an embodiment, reference may be to related descriptions of other embodiments.

One of ordinary skill in the art may be aware that the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. The one of ordinary skill in the art may use different methods to implement the described functions for particular applications, however, the implementation should not be considered as going beyond the scope of the present disclosure.

It should be understood that, in the embodiments of the present disclosure, the disclosed vehicle diagnostic method, vehicle diagnostic system and vehicle diagnostic device could be implemented in other ways. For example, the vehicle diagnostic device described above are merely illustrative; for example, the division of the units is only a logical function division, and other division could be used in the actual implementation, for example, multiple units or components could be combined or integrated into another system, or some features may be ignored, or not performed. In another aspect, the coupling or direct coupling or communicating connection shown or discussed could be an indirect, or a communicating connection through some interfaces, devices or units, which could be electrical, mechanical, or otherwise.

The units described as separate components could or could not be physically separate, the components shown as units could or could not be physical units, which may be located in one place, or may be distributed to multiple network elements. Parts or all of the elements could be selected according to the actual needs to achieve the object of the present embodiment.

In addition, the various functional units in each of the embodiments of the present disclosure may be integrated into a single processing unit, or exist individually and physically, or two or more than two units are integrated into one unit. The aforesaid integrated unit can either be achieved by hardware or be achieved in the form of software functional units.

If the integrated unit is achieved in the form of software functional units, and is sold or used as an independent product, it may be stored in a computer readable storage medium. Based on this understanding, a whole or part of flow process of implementing the method in the aforesaid embodiments of the present disclosure can also be accomplished by using computer program to instruct relevant hardware. When the computer program is executed by the processor, the steps in the various method embodiments described above may be implemented. Wherein, the computer program comprises computer program codes, which may be in the form of source code, object code, executable documents or some intermediate form, etc. The computer readable medium can include: any entity or device that can carry the computer program codes, recording medium, USB flash disk, mobile hard disk, hard disk, optical disk, computer storage device, ROM (Read-Only Memory), RAM (Random Access Memory), electrical carrier signal, telecommunication signal and software distribution medium, etc. It needs to be explained that, the contents contained in the computer readable medium may be added or reduced appropriately according to the requirement of legislation and patent practice in a judicial district, for example, in some judicial districts, according to legislation and patent practice, the computer readable medium doesn't include electrical carrier signal and telecommunication signal.

The aforesaid embodiments are merely intended to explain but not to limit the technical solutions of the present disclosure. Although the present disclosure has been explained in detail with reference to the above-described embodiments, it should be understood for the one of ordinary skill in the art that, the technical solutions described in each of the above-described embodiments can still be amended, or some technical features in the technical solutions may be replaced equivalently; these amendments or equivalent replacements, which fails to enable the essential of corresponding technical solution to break away from the spirit and the scope of the technical solution in various embodiments of the present disclosure, should all be included in the protection scope of the present disclosure.

What is claimed is:

1. A vehicle diagnostic method, comprising steps of:
   determining a standard range of vehicle fault diagnosis;
   reading a current data stream of a vehicle in real time when a vehicle diagnosis instruction is received, and determining whether values of the current data stream are within the standard range; and
   outputting prompt information indicative of normal vehicle operation if the values of the current data stream are within the standard range, or outputting corresponding vehicle fault alarm information if the values of the current data stream are beyond the standard range;
   wherein the step of determining a standard range of vehicle fault diagnosis particularly comprises:
   collecting a sample data stream of the vehicle, counting the maximum value and the minimum value of the sample data stream, and storing the maximum value and the minimum value of the sample data stream as the standard range of the vehicle fault diagnosis;

wherein the step of collecting a sample data stream of the vehicle, counting the maximum value and the minimum value of the sample data stream, and storing the maximum value and the minimum value of the sample data stream as the standard range of the vehicle fault diagnosis comprises:

collecting a standard data stream under a normal vehicle operation according to a preset period;

determining whether the standard data stream collected within the current period comprises a data identifier and a data unit;

deleting the standard data stream if the standard data stream does not comprise the data identifier or the data unit; or determining whether there is sample data stream matching the data identifier in the collected sample data stream, if the standard data stream comprises the data identifier and the data unit; and using the maximum value and the minimum value of the standard data stream to revise the maximum value and the minimum value of the matched sample data stream respectively if there is collected sample data stream matching the data identifier;

collecting and using the standard data stream as a sample data stream if there is no collected sample data stream matching the data identifier.

2. The vehicle diagnostic method according to claim 1, wherein after the step of collecting a sample data stream of the vehicle, counting the maximum value and the minimum value of the sample data stream, and storing the maximum value and the minimum value of the sample data stream as the standard range of the vehicle fault diagnosis, the method further comprises:

displaying the collected sample data stream and the standard range to a user, so that the user revises the standard range according to the displayed sample data stream; and revising the standard range according to the revising instruction if a revising instruction as input by the user is received, wherein the revising instruction comprises a revise object and a revise value.

3. The vehicle diagnostic method according to claim 1, wherein the step of reading a current data stream of a vehicle in real time when a vehicle diagnosis instruction is received, and determining whether values of the current data stream are within the standard range comprises:

reading the current data stream of the vehicle in real time when the vehicle diagnosis instruction is received, and determining whether the current data stream comprises a data identifier and a data unit;

deleting the current data stream if the current data stream does not comprise the data identifier or the data unit; or searching the collected sample data stream for a sample data stream matching the data identifier of the current data stream if the current data stream comprises the data identifier and the data unit; and determining whether the maximum value and the minimum value of the current data stream are within a range between the maximum value and the minimum value of the matched sample data stream.

4. A vehicle diagnostic device, comprising a memory, a processor, and a computer program stored in the memory and executable by the processor, wherein the processor is configured to execute the computer program to implement the steps of:

determining a standard range of vehicle fault diagnosis;

reading a current data stream of a vehicle in real time when a vehicle diagnosis instruction is received, and determining whether values of the current data stream are within the standard range; and outputting prompt information indicative of normal vehicle operation if the values of the current data stream are within the standard range, or outputting corresponding vehicle fault alarm information if the values of the current data stream are beyond the standard range;

wherein the processor is further configured to execute the computer program to implement the step of determining a standard range of vehicle fault diagnosis by collecting a sample data stream of the vehicle, counting the maximum value and the minimum value of the sample data stream, and storing the maximum value and the minimum value of the sample data stream as the standard range of the vehicle fault diagnosis;

wherein the processor is further configured to execute the computer program to implement the step of collecting a sample data stream of the vehicle, counting the maximum value and the minimum value of the sample data stream, and storing the maximum value and the minimum value of the sample data stream as the standard range of the vehicle fault diagnosis by:

collecting a standard data stream under a normal vehicle operation according to a preset period;

determining whether the standard data stream collected within the current period comprises a data identifier and a data unit;

deleting the standard data stream if the standard data stream does not comprise the data identifier or the data unit;

or determining whether there is sample data stream matching the data identifier in the collected sample data stream, if the standard data stream comprises the data identifier and the data unit;

and using the maximum value and the minimum value of the standard data stream to revise the maximum value and the minimum value of the matched sample data stream respectively if there is collected sample data stream matching the data identifier;

collecting and using the standard data stream as a sample data stream if there is no collected sample data stream matching the data identifier.

5. The vehicle diagnostic device according to claim 4, wherein the processor is further configured to execute the computer program to implement the step of displaying the collected sample data stream and the standard range to a user, so that the user revises the standard range according to the displayed sample data stream; and revising the standard range according to the revising instruction if a revising instruction as input by the user is received, wherein the revising instruction comprises a revise object and a revise value.

6. The vehicle diagnostic device according to claim 4, wherein the processor is further configured to execute the computer program to implement the step of reading a current data stream of a vehicle in real time when a vehicle diagnosis instruction is received, and determining whether values of the current data stream are within the standard range by:

reading the current data stream of the vehicle in real time when the vehicle diagnosis instruction is received, and determining whether the current data stream comprises a data identifier and a data unit;

deleting the current data stream if the current data stream does not comprise the data identifier or the data unit;

or searching the collected sample data stream for a sample data stream matching the data identifier of the current data stream if the current data stream comprises the data identifier and the data unit;

and determining whether the maximum value and the minimum value of the current data stream are within a range between the maximum value and the minimum value of the matched sample data stream.

7. A computer readable storage medium which stores a computer program, wherein a processor is configured to execute the computer program to implement the steps of:

determining a standard range of vehicle fault diagnosis;

reading a current data stream of a vehicle in real time when a vehicle diagnosis instruction is received, and determining whether values of the current data stream are within the standard range; and outputting prompt information indicative of normal vehicle operation if the values of the current data stream are within the standard range, or outputting corresponding vehicle fault alarm information if the values of the current data stream are beyond the standard range;

wherein the processor is further configured to execute the computer program to implement the step of determining a standard range of vehicle fault diagnosis by collecting a sample data stream of the vehicle, counting the maximum value and the minimum value of the sample data stream, and storing the maximum value and the minimum value of the sample data stream as the standard range of the vehicle fault diagnosis;

wherein the processor is further configured to execute the computer program to implement the step of collecting a sample data stream of the vehicle, counting the maximum value and the minimum value of the sample data stream, and storing the maximum value and the minimum value of the sample data stream as the standard range of the vehicle fault diagnosis by:

collecting a standard data stream under a normal vehicle operation according to a preset period;

determining whether the standard data stream collected within the current period comprises a data identifier and a data unit;

deleting the standard data stream if the standard data stream does not comprise the data identifier or the data unit;

or determining whether there is sample data stream matching the data identifier in the collected sample data stream, if the standard data stream comprises the data identifier and the data unit;

and using the maximum value and the minimum value of the standard data stream to revise the maximum value and the minimum value of the matched sample data stream respectively if there is collected sample data stream matching the data identifier;

collecting and using the standard data stream as a sample data stream if there is no collected sample data stream matching the data identifier.

8. The computer readable storage medium according to claim 7, wherein the processor is further configured to execute the computer program to implement the step of displaying the collected sample data stream and the standard range to a user, so that the user revises the standard range according to the displayed sample data stream; and revising the standard range according to the revising instruction if a revising instruction as input by the user is received, wherein the revising instruction comprises a revise object and a revise value.

9. The computer readable storage medium according to claim 7, wherein the processor is further configured to execute the computer program to implement the step of reading a current data stream of a vehicle in real time when a vehicle diagnosis instruction is received, and determining whether values of the current data stream are within the standard range by:

reading the current data stream of the vehicle in real time when the vehicle diagnosis instruction is received, and determining whether the current data stream comprises a data identifier and a data unit;

deleting the current data stream if the current data stream does not comprise the data identifier or the data unit;

or searching the collected sample data stream for a sample data stream matching the data identifier of the current data stream if the current data stream comprises the data identifier and the data unit;

and determining whether the maximum value and the minimum value of the current data stream are within a range between the maximum value and the minimum value of the matched sample data stream.

* * * * *